US011148171B2

(12) United States Patent
Galvin

(10) Patent No.: US 11,148,171 B2
(45) Date of Patent: Oct. 19, 2021

(54) APPARATUS AND METHOD FOR THE DRY SEPARATION OF PARTICLES

(71) Applicant: The University of Newcastle, Callaghan (AU)

(72) Inventor: Kevin Patrick Galvin, Callaghan (AU)

(73) Assignee: The University of Newcastle, Callaghan (AU)

( * ) Notice: Subject to any disclaimer, the term of this patent is extended or adjusted under 35 U.S.C. 154(b) by 232 days.

(21) Appl. No.: 16/321,498

(22) PCT Filed: Aug. 1, 2017

(86) PCT No.: PCT/AU2017/050802
§ 371 (c)(1),
(2) Date: Jan. 29, 2019

(87) PCT Pub. No.: WO2018/023157
PCT Pub. Date: Feb. 8, 2018

(65) Prior Publication Data
US 2020/0368783 A1 Nov. 26, 2020

(30) Foreign Application Priority Data

Aug. 1, 2016 (AU) .............................. 2016903017

(51) Int. Cl.
*B07B 4/08* (2006.01)
*B07B 1/36* (2006.01)
*B07B 1/46* (2006.01)

(52) U.S. Cl.
CPC ................ *B07B 4/08* (2013.01); *B07B 1/36* (2013.01); *B07B 1/469* (2013.01)

(58) Field of Classification Search
CPC .... B07B 4/08; B07B 4/02; B07B 9/00; B07B 1/36; B07B 1/469; B01J 8/1872
See application file for complete search history.

(56) References Cited

U.S. PATENT DOCUMENTS 3,044,619 A 7/1962 Knolle
4,133,749 A 1/1979 Jelinek et al.
(Continued)

FOREIGN PATENT DOCUMENTS

AU 4151085 A 10/1986
GB 1 366 293 A 9/1974

OTHER PUBLICATIONS

Search Report in International Application No. PCT/AU2017/050802 dated Oct. 3, 2017, 4 pages.
(Continued)

*Primary Examiner* — Charles A Fox
*Assistant Examiner* — Jessica L Burkman
(74) *Attorney, Agent, or Firm* — Marshall, Gerstein & Borun LLP

(57) ABSTRACT

An apparatus and method for the dry separation of bulk particulate material, especially coarse particles, is provided. The apparatus comprises a chamber, a screen adjacent the chamber and a fluidising device fluidly connected to the chamber. The screen has a screen surface, a plurality of apertures and an opening larger in size than the aperture. A mixture of the coarse particles and a fine particulate medium is fed into the chamber. The fluidising device directs a fluidising fluid to fluidise a fine particulate medium and create a fluidised bed directed towards the screen. The fine particulate medium and the coarse particles pass from the chamber through the openings. The fine particulate medium passes back through the apertures to the chamber. Relatively high density coarse particles also pass back through the openings to the chamber. Relatively low density coarse particles are retained on the screen surface. Vibrations may also be used.

20 Claims, 7 Drawing Sheets

(56) References Cited

U.S. PATENT DOCUMENTS

| | | | | |
|---|---|---|---|---|
| 4,646,484 | A | * | 3/1987 | Brull ........................ B24C 3/263 |
| | | | | 451/38 |
| 4,913,804 | A | | 4/1990 | Muller |
| 5,348,161 | A | * | 9/1994 | Mueller .................... B07B 4/08 |
| | | | | 209/29 |
| 2004/0000235 | A1 | | 1/2004 | Oshitani et al. |
| 2015/0060582 | A1 | | 3/2015 | Truce et al. |
| 2015/0209830 | A1 | | 7/2015 | Edwards et al. |
| 2017/0087596 | A1 | * | 3/2017 | Vasanthan ................. B07B 9/00 |

OTHER PUBLICATIONS

Extended European Search Report for European Application No. 17836091.3, dated Jan. 20, 2020.

Kumar et al., "A Novel Sink-Hole Fluidization Method for Dry Separation of Iron Ore Fines," Iron Ore 2017, Paper No. 23, 10 pages.

Kumar et al., "Sink-Hole Fluidization for Dry Separation of Mineral Particles," Chemeca Conference, Sep. 30-Oct. 3, 2018, Chemeca 2018, Paper No. 76, Queenstown, New Zealand, 9 pages.

Kumar et al., "Dry Separation Using a Fluidized Sink-Hole," Minerals Engineering 127, 2018, pp. 105-113.

\* cited by examiner

APPARATUS AND METHOD FOR THE DRY SEPARATION OF PARTICLES

FIELD OF THE INVENTION

The invention relates to an apparatus and method for the dry separation of particles and in particular to a dry particle separator and dry particle separation method using a fluidised bed. The invention has been developed primarily for use in separating mineral ore particles and will be described hereinafter by reference to this application.

BACKGROUND OF THE INVENTION

The following discussion of the prior art is intended to present the invention in an appropriate technical context and allow its advantages to be properly appreciated. Unless clearly indicated to the contrary, however, reference to any prior art in this specification should not be construed as an express or implied admission that such art is widely known or forms part of common general knowledge in the field.

Processing techniques to extract minerals from ores usually follow a breakage stage to reduce the particle size to a manageable level, and may also involve further size reduction to liberate material of value, creating a broad size distribution of particles. Most plants then separate the particles using a liquid medium that consists primarily of water using water based gravity separation techniques and sometimes water based flotation. Sometimes another material of exceedingly fine particles is added to the water to increase the density of the medium, allowing dense medium separation to be undertaken.

From the moment that water is added to the particles, a major problem is created. Ultimately that water needs to be removed from the particles of value and the waste. The waste particles consist of relatively coarse particles, which can be dewatered using screens and centrifuges. The exceedingly fine particles less than about 0.5 mm are usually processed in a thickener and then stored as tailings, resulting in water losses. Similarly, the water must be substantially removed from the relatively coarse and exceedingly fine product. Because of these problems, alternative dry processing options have been developed. This need is especially beneficial for mining operations in areas where there is little or no access to water to permit water-based separation processes.

However, in general, dry separation methods are much less efficient than water based methods. Hence, there is significant need and scope for major improvements to existing dry separation technologies.

Dry separation methods and apparatuses have been developed using two main approaches. The first approach uses an inclined table which is vibrated and subjected to an air flow through the table surface via small holes to help form an autogenous dense medium above the table. The transport of the particles across the table, subjected to vibrational and air flow, causes separation of the coarse particles into higher and lower density portions.

The second common approach involves fluidised beds comprising of a fine dense medium formed by fine medium particles typically less than 1 mm in diameter suspended in an upward flow of air. This process of dry fluidisation, which generates a dense medium, helps to sort coarse particles on the basis of density. The fluidised bed will separate the less dense coarse particles from the denser coarse particles into two main layers. The top layer of less dense particles are "skimmed" off using a mechanical scoop or blade to divert the top layer, while the denser particles are discharged from below.

It will be appreciated that gas-solid separators are often difficult to manage. There is a tendency for the coarse particles to experience variable conditions and density variations in the medium due to gas-solid bubble transport. These conditions promote a degree of mixing which then opposes the density based segregation that is required. It is also difficult to force a feed flow of coarse particles to move through the separator. For example, if the feed of coarse particles is added into a deep fluidised bed formed by a fine medium of particles, the coarse particles can produce a plume effect that sends low density and high density particles downwards. The low and high density particles then need to segregate, allowing the lower density coarse particles to migrate to the top of the bed. Thus, the feed can also produce a significant hold-up that adversely impacts on the quality of the fine medium and on the capacity of the separator to process the feed efficiently at a high rate. The net result is that it is difficult to operate such a separator to produce a sharp density based separation, allowing the coarse particles of lower density to be removed efficiently on a continuous basis from the coarse particles of higher density.

It is an object of the present invention to overcome or substantially ameliorate one or more of the deficiencies of the prior art, or at least to provide a useful alternative.

SUMMARY OF THE INVENTION

This invention is concerned with the beneficiation of relatively coarse particles in the range of 1 to 100 mm in diameter, preferably in the range of 10 to 50 mm in diameter and most preferably in the range of 1 mm to 10 mm in diameter. Throughout the specification, the term "coarse particles" refers to particles in the above size ranges. Thus, the invention is directed to the separation of a feed comprising the coarse feed particles to produce high density coarse particles and low density coarse particles. In some embodiments applied to operations such as iron ore production, the product comprises of the high density coarse particles, while in other embodiments applied to operations such as coal production, the product comprises of the low density coarse particles. Clearly, the invention is directed to the separation of the coarse particles primarily on the basis of the particle density.

According to a first aspect of the invention, there is provided an apparatus for the dry separation of coarse particles comprising:

a chamber for receiving a mixture of said coarse particles and a fine particulate medium;

a screen adjacent said chamber for separating said coarse particles, said screen comprising a screen surface, a plurality of apertures and an opening larger in size than said apertures; and a fluidising device fluidly connected to said chamber for directing a fluidising fluid into said chamber to fluidise said fine particulate medium, thereby creating a fluidised bed directed towards said screen;

wherein said opening is configured to permit said fine particulate medium and said coarse particles to pass through said screen from said chamber;

said apertures are configured to permit said fine particulate medium to pass back through said screen to said chamber and to prevent said coarse particles from passing back through said screen;

said opening also being configured to permit relatively high density coarse particles to pass back through said screen to said chamber; and said screen retains relatively low density coarse particles on said screen surface.

In some embodiments, the screen comprises a plurality of openings.

In one embodiment, the openings are substantially the same size. Preferably, the openings have a diameter proportional to a diameter of the relatively high density coarse particles. More preferably, the openings have a diameter at least twice the maximum diameter of the relatively high density coarse particles. In one preferred form, the maximum diameter of the relatively high density coarse particles is 10 mm and the openings have a diameter of 20 mm. In another preferred form, the maximum diameter of the relatively high density coarse particles is less than 10 mm and the openings have a diameter of between 10 and 20 mm.

In some embodiments, the screen comprises two or more openings that are different in size to permit relatively high density coarse particles of different sizes to pass back through said screen to the chamber. Preferably, there are two or more groups of openings that are different in size. Most preferably, there are three groups of openings that are different in size. In one preferred embodiment, a first group of openings has a diameter of 6 mm, a second group of openings has a diameter of 12 mm and a third group of openings has a diameter of between 15 and 20 mm.

In other embodiments, there are a greater number of openings that are smaller in size than the number of openings that are larger in size. Where there are three or more openings of different sizes, preferably the number of openings gradually decreases as the size of the openings increase.

In yet another embodiment, the openings that have the largest size are located near an outlet for removing said relatively low density coarse particles from said screen. Preferably, the size of the openings gradually increases from the inlet to the outlet.

In some embodiments, the screen comprises a mesh and there is a plurality of the openings spaced apart at regular intervals in the mesh and between the apertures.

In some embodiments, the screen comprises a plate and there is a plurality of the openings spaced apart at regular intervals in the plate and between the apertures.

In some embodiments, a flow rate of the fluidising flow is variable across the screen.

In some embodiments, the apparatus further comprises an inlet for feeding the coarse particles and the fine particulate medium into the chamber and an outlet for removing the relatively low density coarse particles from the screen. It is further preferred that the chamber has a discharge outlet for removing the relatively high density coarse particles from the apparatus.

In some embodiments, the screen is located to a first side of the chamber and the fluidising device is located to a second side of the chamber. Preferably, the first side and the second side are opposite sides of the chamber. More preferably, the screen is located above the chamber and the fluidising device is located below the chamber.

In some embodiments, the chamber comprises a perforated surface to permit the fluidising fluid to flow into the chamber.

In some embodiments, the apparatus comprises a first vibration mechanism for facilitating movement of the coarse particles across the screen. Preferably, the first vibration mechanism facilitates movement of the coarse particles from the inlet to the outlet. More preferably, the first vibration mechanism facilitates movement of the relatively high density coarse particles within the chamber towards the discharge outlet. In some embodiments, the first vibration mechanism influences the fluidisation of the fine particulate medium and/or facilitates formation of a homogeneous fluidised bed. In other embodiments, the first vibration mechanism influences the fluidisation of the fine particulate medium via the chamber. In some embodiments, the first vibration mechanism is connected to the chamber and/or the screen.

In some embodiments, the apparatus comprises a second vibration mechanism for facilitating movement of the coarse particles across the screen. Preferably, the second vibration mechanism facilitates movement of the coarse particles from the inlet to the outlet. More preferably, the second vibration mechanism facilitates movement of the relatively high density coarse particles within the chamber towards the discharge outlet. In some embodiments, the second vibration mechanism influences the fluidisation of the fine particulate medium and/or facilitates formation of a homogeneous fluidised bed. In other embodiments, the second vibration mechanism influences the fluidisation of the fine particulate medium via the chamber. In some embodiments, the first vibration mechanism is connected to the chamber and/or the screen.

In further embodiments, the apparatus comprises the first vibration mechanism to vibrate the chamber and a second vibration mechanism to vibrate the screen. In other embodiments, the apparatus comprises the first vibration mechanism to vibrate the screen and a second vibration mechanism to vibrate the chamber. In one preferred form, the first vibration mechanism operates independently of the second vibration mechanism.

In some embodiments, the apparatus further comprises a cover for preventing the escape of any fine particulate medium entrained in an air flow above the screen. In some embodiments, the cover comprises a hood having an exhaust for controllably removing the fine particulate medium. The hood may also have a suction device for drawing the fine particulate medium through the exhaust. Alternatively, the hood has a positive pump for drawing the fine particulate medium through the exhaust. In another embodiment, the fine particulate medium is filtered from the air flow. In one preferred embodiment, the exhaust is fluidly connected to a recycling conduit for returning the fine particulate medium to the chamber.

According to a second aspect of the invention, there is provided a method for the dry separation of coarse particles, comprising:

receiving a mixture of said coarse particles and a fine particulate medium within a chamber;

providing a screen with a screen surface, a plurality of apertures and an opening larger in size than said apertures;

directing a fluidising fluid into said chamber to fluidise said fine particulate medium, thereby creating a fluidised bed directed towards said screen;

permitting said fine particulate medium and said coarse particles to pass through said opening from said chamber;

permitting said fine particulate medium to pass through said apertures back to said chamber;

preventing said coarse particles from passing back through said apertures to said chamber;

permitting relatively high density coarse particles to pass back through said opening to said chamber against the flow of said fluidised fine particulate medium through said opening; and retaining relatively low density coarse particles on said screen surface.

In some embodiments, the method comprises providing a plurality of said openings.

In some embodiments, the method comprises providing openings that are substantially the same size. Preferably, the method comprises providing the openings with a diameter proportional to a diameter of the relatively high density coarse particles. More preferably, the method comprises providing the openings with a diameter at least twice the maximum diameter of the relatively high density coarse particles. In one preferred form, the method comprises providing the openings with a diameter of 20 mm. In another preferred form, the method comprises providing the openings with a diameter of between 10 and 20 mm.

In some embodiments, the method comprises providing two or more openings that are different in size to permit relatively high density coarse particles of different sizes to pass back through said screen to the chamber. Preferably, the method comprises providing two or more groups of openings that are different in size. Most preferably, the method comprises providing three groups of openings that are different in size. In one preferred embodiment, the method comprises providing a first group of openings having a diameter of 6 mm, a second group of openings having a diameter of 12 mm and a third group of openings having a diameter of between 15 and 20 mm.

In other embodiments, the method comprises providing a greater number of openings that are smaller in size than the number of openings that are larger in size. Where there are three or more openings of different sizes, preferably the method comprises gradually decreasing the number of openings as the size of the openings increase.

In some embodiments, the method comprises providing feeding the mixture of the coarse particles and the fine particulate medium into the chamber through an inlet and removing the relatively low density coarse particles from the screen through an outlet. It is further preferred that the method comprises removing the relatively high density coarse particles from the chamber through a discharge outlet.

In yet another embodiment, the method comprises locating the openings that have the largest size near the outlet. Preferably, the size of the openings gradually increases from the inlet to the outlet.

In some embodiments, there is a plurality of the openings and the method further comprises spacing apart said openings at regular intervals in the screen and between the apertures. In one embodiment, the method further comprises forming the screen from a mesh. In another embodiment, the method further comprises forming the screen from a plate.

In some embodiments, the method comprises varying a flow rate of the fluidising flow across the screen.

In some embodiments, the method comprises locating the screen to a first side of the chamber and the fluidising device is located to a second side of the chamber. Preferably, the method comprises locating the screen and the fluidising device at opposite sides of the chamber. More preferably, the method comprises locating the screen above the chamber and the locating the fluidising device below the chamber.

In some embodiments, the method comprises providing the chamber with a perforated surface to permit the fluidising fluid to flow into the chamber.

In some embodiments, the method comprises vibrating the apparatus to facilitate movement of the coarse particles across the screen. Preferably, the vibrating step facilitates movement of the coarse particles from the inlet to the outlet, and more preferably, movement of the relatively high density coarse particles within the chamber towards the discharge outlet. In further embodiments, said vibrating step comprises vibrating said chamber and/or screen In some embodiments, method comprises vibrating the apparatus to influence the fluidisation of the fine particulate medium and/or facilitate formation of a homogeneous fluidised bed. Preferably, the vibrating step influences the fluidisation of the fine particulate medium via the chamber. In further embodiments, said vibrating step comprises vibrating said chamber and/or screen.

In some embodiments, the method comprises vibrating the chamber and/or the screen. In further embodiments, the method comprises vibrating the screen independently of the chamber.

In some embodiments, the method comprises preventing the escape of any fine particulate medium entrained in an air flow above the screen. In some embodiments, the method comprises controllably removing the fine particulate medium through an exhaust. The method may comprise drawing the fine particulate medium through the exhaust or pumping the fine particulate medium through the exhaust. In another embodiment, the method comprises filtering the fine particulate medium from the air flow. In one preferred embodiment, the method comprises recycling the fine particulate medium to the chamber.

Unless the context clearly requires otherwise, throughout the description and the claims, the words "comprise", "comprising", and the like are to be construed in an inclusive sense as opposed to an exclusive or exhaustive sense; that is to say, in the sense of "including, but not limited to".

Furthermore, as used herein and unless otherwise specified, the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

BRIEF DESCRIPTION OF THE DRAWINGS

Preferred embodiments of the invention will now be described, by way of example only, with reference to the accompanying drawings in which.

PREFERRED EMBODIMENTS OF THE INVENTION

Figure 1:
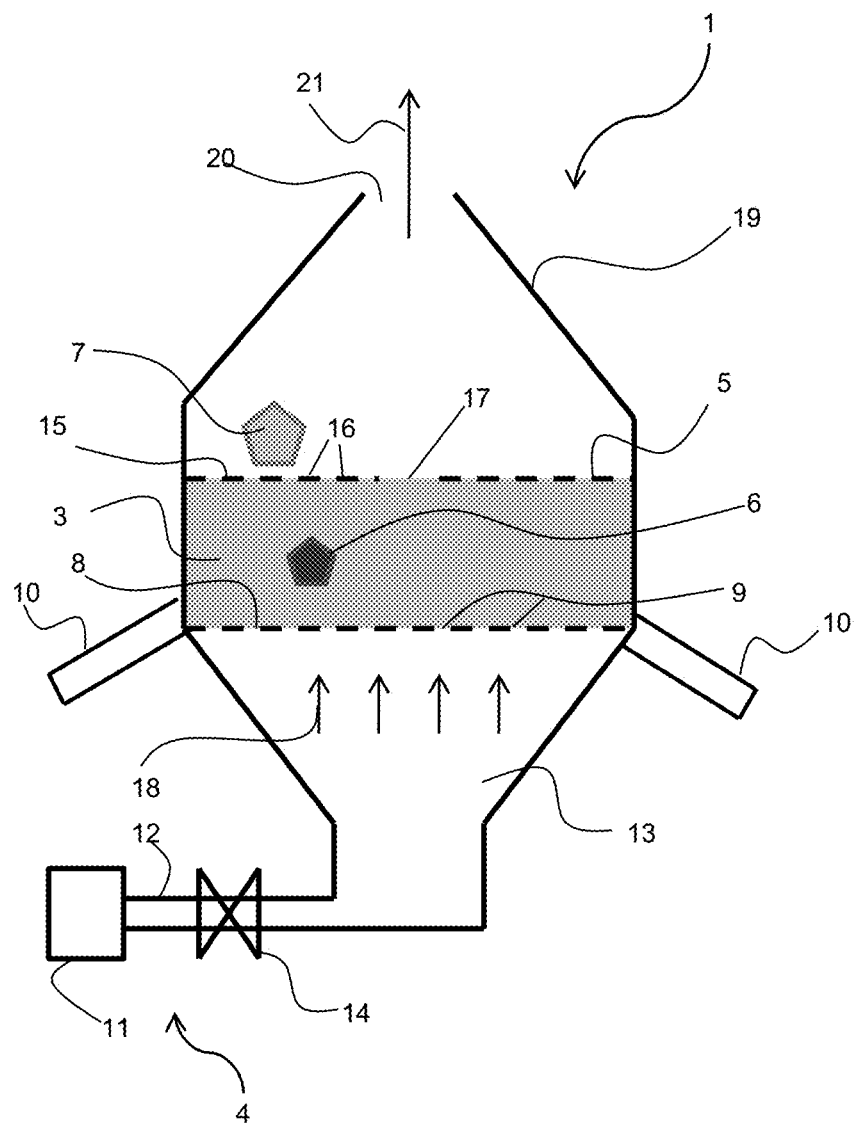
FIG. 1 is a side view of an apparatus for the dry separation of coarse particles according to an embodiment of the invention under batch conditions.

The present invention will now be described with reference to the following examples which should be considered in all respects as illustrative and non-restrictive. In the Figures, corresponding features within the same embodiment or common to different embodiments have been given the same reference numerals.

In dry separation processes, the fine particulate medium is typically formed from fine particles ideally less than 0.5 mm, but ideally not so fine that the particles become elutriated as dust. The fine particulate medium is selected in order to target an appropriate medium density to capture the valuable coarse particles to be separated from the coarse particles. For example, in coal processing, the fine particulate medium may be formed from sand to separate coarse coal particles of lower density from other coarse mineral particles of higher density. In another example, in iron ore processing, the fine particulate medium may be formed primarily from fine iron ore mixed with fine sand.

The present invention in some embodiments has been developed to separate coarse particles that vary in size from between 1.0 mm and 10.0 mm in diameter (which might be described as "small" coarse particles) to in excess of 10.0 mm in diameter (which might be described as "large" coarse particles). Hence, the term "coarse particles" is used throughout the specification to refer to these particles having a diameter equal to or greater than 1.0 mm. These coarse particles are large relative to the fine particulate particles used to form the fine particulate medium.

Referring to FIG. 1, an apparatus 1 employing a dry fluidised bed 2 comprises a chamber 3 for receiving a mixture of coarse particles and a fine particulate medium, a fluidising device 4 and a screen 5. The fluidised bed 2 is formed from the fine particulate medium (being less than 1.0 mm in diameter). The coarse particles are to be separated into relatively high density coarse particles 6 and relatively low density coarse particles 7. The chamber 3 comprises a base 8 having perforations 9. Vibratory members 10 are connected to either side of the chamber 3 to agitate or vibrate the chamber.

The fluidising device 4 is located beneath the chamber 3 and comprises a distributor, a gas source 11, a gas conduit 12, a fluidising chamber 13 and a valve 14. The distributor is integrally formed in the base 8 of the chamber 3 and comprises the perforations 9 to direct gas into the chamber 3 in a manner that achieves the required distribution of the fluid. Gas, such as a chemically inert gas or air, is delivered from the gas source 11 through the gas conduit 12 via the valve 14 into the fluidising chamber 13, from which the gas is directed through the distributor 9 into the chamber 3 to fluidise the mixture.

The screen 5 is located above the chamber 3, and in operation is designed to be at the same or substantially same height as the height of the fluidised bed 2. The screen 5 has a screen surface 15, a plurality of fine apertures 16 and at least one opening 17 larger than the other apertures. This larger sized opening 17, hereinafter referred to as a "sink hole", permits the relatively high density coarse particles 6 to either remain at the height or elevation of the screen surface 15 elevation or "sink" (i.e., return) to the fluidised bed 2 and the chamber 3. It will be appreciated that more than one sink hole 17 can be provided in the screen 5 in this embodiment or other embodiments. Preferably, a relatively small fraction of the screen surface 15 comprises one or more of the sink holes 17. The smaller sized apertures 16 allow the fine particulate medium to readily pass through the screen 5 and return to the fluidised bed 2 and the chamber 3.

In operation, the fine particulate mixture, comprising the fine particulate medium is fed into the chamber 3 below the screen, while the coarse particles 6 are fed onto the screen 5 as a batch. Alternatively, the fine particle medium is fed onto the screen 5, from where it can fall into the chamber 3. The fluidising device 4 operates to deliver a fluidising gas as shown by arrows 18 through the distributor 9 and create the fluidised bed 2 in the chamber 3, which directs a fluidising flow of the fine particulate medium towards the screen 5. At the same time, the chamber 3 is vibrated by the vibratory members 10, facilitating fluidisation and formation of the fluidised bed 2. The vibrations also assist in moving any particles along the screen surface 15 to assist in separation.

The sink holes 17 induces a flow of the fluidised fine particulate medium in the upward direction through these sink holes. This flow is due to the increased permeability of the fluidised fine particulate medium flow through the sink holes 17 compared to the smaller apertures 16. The rising fluidised fine particulate medium lifts the low density coarse particles 7 in the upwards direction, and hence forces the lower density coarse particles to remain at the screen surface 15. In other words, the sink holes 17 induce a unidirectional flow that retains the lower density coarse particles 6 on the screen 5 and prevents their return to the fluidised bed 2.

Meanwhile, the relatively high density coarse particles 6 sink or fall through this rising fluidised fine particulate medium due to the higher density relative to the overall density of the fluidised fine particulate medium. The fine particulate medium of particles that rise upwards through the sink holes 17 and onto the screen surface 15 tend to fall through the smaller apertures 16, allowing them to return to the fluidised zone below in the fluidised bed 2. The apertures 16 also prevent the coarse particles 6, 7 to pass through so that the higher density particles 7 must pass through the sink holes 17 in order to reach the chamber 3. Accordingly, this results in separation of the lower density coarse particles 7 from the rest of the fine particulate medium and the higher density coarse particles 6.

The apparatus 1 is enclosed by a cover in the form of a hood 19 having a conical or inclined sidewalls tapering up to an outlet 20. The hood 19 ensures that the fine particulate medium, especially the finest of these particles as well as any dust, does not escape the apparatus 1 and contaminate the ambient environment. Most of the fine particulate medium segregates from the air flow (the air flow being generated above the screen 5 from the fluidising flow of the fluidised bed 2) but the more dusty particles tend to entrain with the air flow. A suction device or positive pump (not shown) may be used to draw up the fine dust as indicated by arrow 21 for recovery and reuse in the chamber 3. In a further alternative, the dusty particles are filtered from the flow.

The use of a vibration mechanism (such as the vibratory members 10) assists the separation process as the vibrations encourage movement of the fine particulate medium as a more homogeneous medium, thus form a homogeneous fluidised bed. Moreover, the separation proceeds more effectively and efficiently due to vibration of the fluidised bed 2 via vibration of the chamber 3. However, the screen 5 may also be vibrated directly to increase this separation efficiency by a suitable connection to the vibratory members 10 or using another set of vibratory members connected to the screen 5. In this latter case, the additional set of vibratory members may operate independently of the vibratory members 10 or be connected to the vibratory members 10.

In general, vibration is preferred as the fluidisation process is known to be influenced by vibration in a way that improves the action of the fine particulate medium in that vibration facilitates the return of the fine particle medium from above the screen surface 15 to the fluidised bed 2 below. In particular, the vibration can help disrupt the bubbly flow of the gas up through the fluidised bed 2. Vibration may also assist with the transport of the lower density coarse particles 7 across the screen surface 15 from one side to the other; preventing particle-particle bridging or blockage of the apertures 16 or sink holes 17; and creating a closer interaction between the rising fluidising particulate mixture and the screen surface 15.

These functions of facilitating movement of the coarse particles across the screen 5 and influencing the fluidisation of the fine particulate medium or facilitating formation of a homogeneous fluidised bed 2 can be performed separately by different vibrators. For example, the movement of the coarse particles may be facilitated by the vibratory members 10 attached to the chamber 3 while the effect on fluidisation of the fine particulate medium or formation of the homogeneous fluidised bed 2 may be facilitated by a vibratory member or members attached to the screen 5. The reverse configuration may be possible where the vibratory members 10 attached to the chamber 3 affect the fluidisation of the fine particulate medium or facilitate formation of the homogeneous fluidised bed, 2 while the vibratory member or members attached to the screen 5 facilitate movement of the coarse particles.

Figure 2:
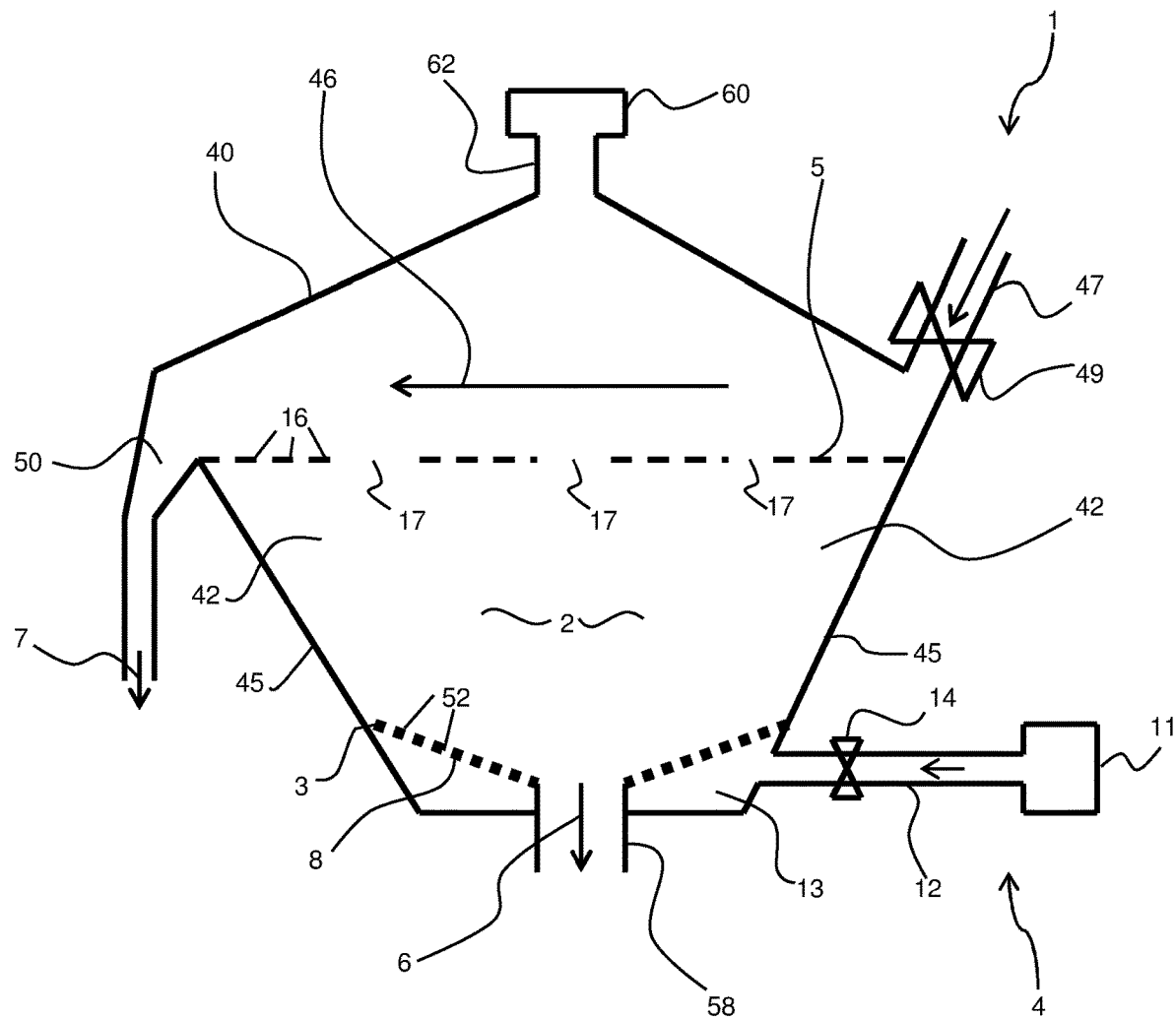
FIG. 2 is a side view of another apparatus for the dry separation of coarse particles according to another embodiment of the invention, permitting continuous steady state separation.

Referring to FIG. 2, another embodiment of the apparatus 1 is illustrated where it is designed for continuous or steady state operation instead of on a batch operation basis as in FIG. 1. In the apparatus 1, the fluidised bed 2 is formed in the chamber 3 and the screen 5 with the fluidising device 4 located beneath the base 8. The apparatus also comprises a separation chamber in the form of a hood 40 connected to the walls 45 of the chamber 3. A feed inlet 47 is located above the screen 5 adjacent the hood 40 to deliver a feed of the coarse particles, ideally dropping onto the screen surface 15 from above. The feed inlet 47 has a double valve arrangement 49 to prevent the fine particulate medium escaping as dust. The fine particulate medium may originate from another refining or separation process, such as a dry screening process to remove finer particles.

As the feed inlet 47 delivers the fine particulate medium onto the screen 5, the chamber 3 is gradually filled and the fluidising device 4 then operates in the same way as described above to create a fluidised bed 2 in the chamber 3. The valve 14 in this embodiment is an air flow valve with a flow meter to control the rate of the fluidising gas flow. The walls 45 are vibrated by suitable vibratory members (not shown in order to improve clarity) to induce movement of the fine particulate mixture along the screen 5 as shown by the arrow 46 and facilitate fluidisation. The sink holes 17 induce the flow of the fine particulate medium up from the fluidised bed 2 and onto the screen surface 15. The apertures 16 permit the fine particulate medium to pass back through the screen 5 and return to the fluidised bed 2 in the chamber 3 but prevent the coarse particles 6, 7 from passing through. The higher density coarse particles 6 fall down through the sink holes 17, passing through the screen 5, entering the fluidised bed 2 while the lower density coarse particles 7 remain on the screen surface 15, where they move under vibration towards an overflow removal device 50. It will be appreciated that the lower density coarse particles 7 remain on the screen 5 because they are of insufficient density to fall through the sink holes 17 against the upward flowing fine particulate medium created by the fluidised bed 2.

In this embodiment, the sink holes 17 are substantially the same size and preferably are designed to have a diameter proportional to a diameter of the higher density coarse particles 6. It is preferred that the openings or sink holes 17 have a diameter at least twice the maximum diameter of the higher density coarse particles to ensure that the higher density coarse particles are able to physically pass through the sink hole 17 and into the chamber 3 against the fluidised flow of the fine particulate medium. Where the maximum diameter of the higher density coarse particles 6 is 10 mm, then the sink holes 17 have a diameter of 20 mm. In other cases, where the maximum diameter of the higher density coarse particles 6 is less than 10 mm, the sink holes 17 may have a diameter of between 10 and 20 mm. In this instance, the smaller sized sink holes 17 will improve the separation of the smallest of the higher density coarse particles 6. It has been determined that for higher density coarse particles of a given size there is an optimum size for the opening or sink hole 17 for achieving density based separation.

The higher density coarse particles 6, which fall through the sink holes 17, will tend to fall rapidly through the fluidised bed 2 towards the base 8 of the chamber 3. The base 8 comprises the distributor 9 of the fluidising device 4, which has fine holes or nozzles 52 for delivering the air flow to the fluidised bed 2. The fluidising chamber 13 below the distributor 9 operates at elevated pressure in order to ensure even air distribution. The base 8 has an inclined surface to help direct the dense and coarse particles 6 to a lower discharge outlet 58. The discharge outlet 58 has a rotary valve (not shown) to allow the higher density coarse particles 6 to be removed from the apparatus 1 as an underflow. Alternatively, the discharge outlet 58 has one or more solenoid valves. The discharge outlet 58 also has a valve arrangement which minimises the loss of gas/air and fine particulate medium during the discharge of the higher density coarse particles 6 to the underflow. The underflow discharge lands onto a secondary screen, either vibratory or static, to separate the fine particulate medium from the coarse particles. Some air flow can be directed to clean the higher density coarse particles 6 of the fine particulate medium. An inclined secondary screen can be used to induce movement of the higher density coarse particles 6 for removal, such as rotation and/or sliding.

The overflow removal device comprises a pipe or conduit 50 so that the lower density coarse particles can roll off the screen surface 15 into the overflow. The conduit 50 may have a double valve arrangement to prevent fine particulate medium escaping as dust. However, some of the fine particulate medium is entrained with the lower density coarse particles 7. Accordingly, the particles captured in the overflow fall onto a secondary screen, either vibratory or static. As is described above, some air flow can be directed to clean the lower density coarse particles 7 of the fine particulate medium. The secondary screen can be inclined to induce movement of the lower density coarse particles 7 for removal, such as rotation and/or sliding.

As with the embodiment of FIG. 1, the upper part of the apparatus 1 is enclosed by the hood 40 to confine any fine dust and a suction device 60 is used to draw the fine dust through an exhaust 62 from the apparatus and subsequent filtration from the air. Alternatively, a positive pressure pump is used to draw the dust. The recovered fine particulate medium is then reused, as discussed below.

The fine particulate medium removed from the overflow and underflow is transported via steep inclined pipes (not shown) towards a vertical riser (not shown). This vertical riser comprises a conventional gas-solid fluidised bed that extends to a height above the overall apparatus 1. A pipe (not shown) transports the fluidised particles from the conventional fluidised bed back towards the fluidised bed 2 in the apparatus 1. In this way, the fine particulate medium is recycled to minimise loss of the medium. The entrance of this pipe is ideally above the screen 5 to ensure an easy entrance of the returning fine particulate medium or is connected to the feed inlet 47. This also permits the addition of replacement fine particulate medium where required.

In some embodiments, the screen 5 is inclined at an angle to assist in transportation of the lower density coarse particles from the screen surface 15 for removal from the apparatus 1 and the higher density coarse particles 6 for removal through one or more sink holes 17. However, the vibration mechanism as described above can be used to transport the particles up a slight gradient, horizontally, or downwards. The horizontal approach is preferred, as this ensures that the fine particulate medium interacts more evenly with the screen 5. In this way, the higher density coarse particles 6 can bump across the screen 6, being exposed periodically to a sink hole 17.

Figure 3:
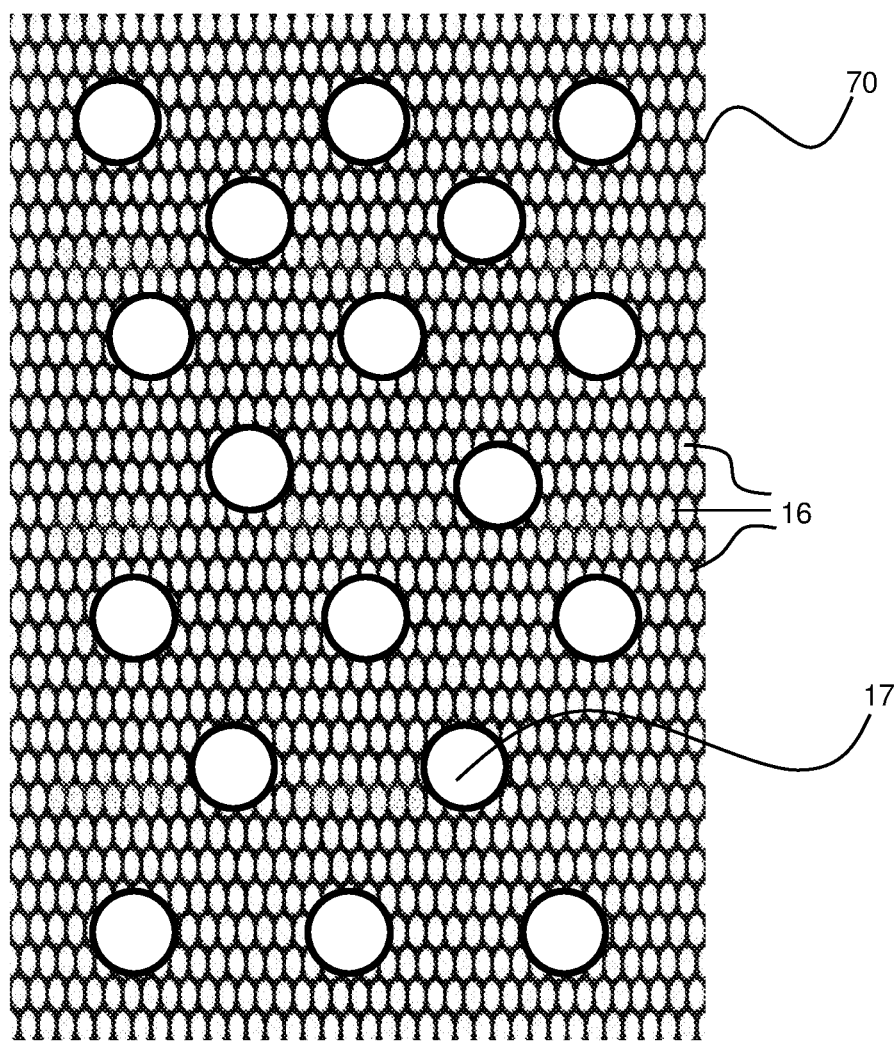
FIG. 3 is a plan view of one embodiment of a screen for use in the apparatus of FIG. 1 or 2.
Figure 4:
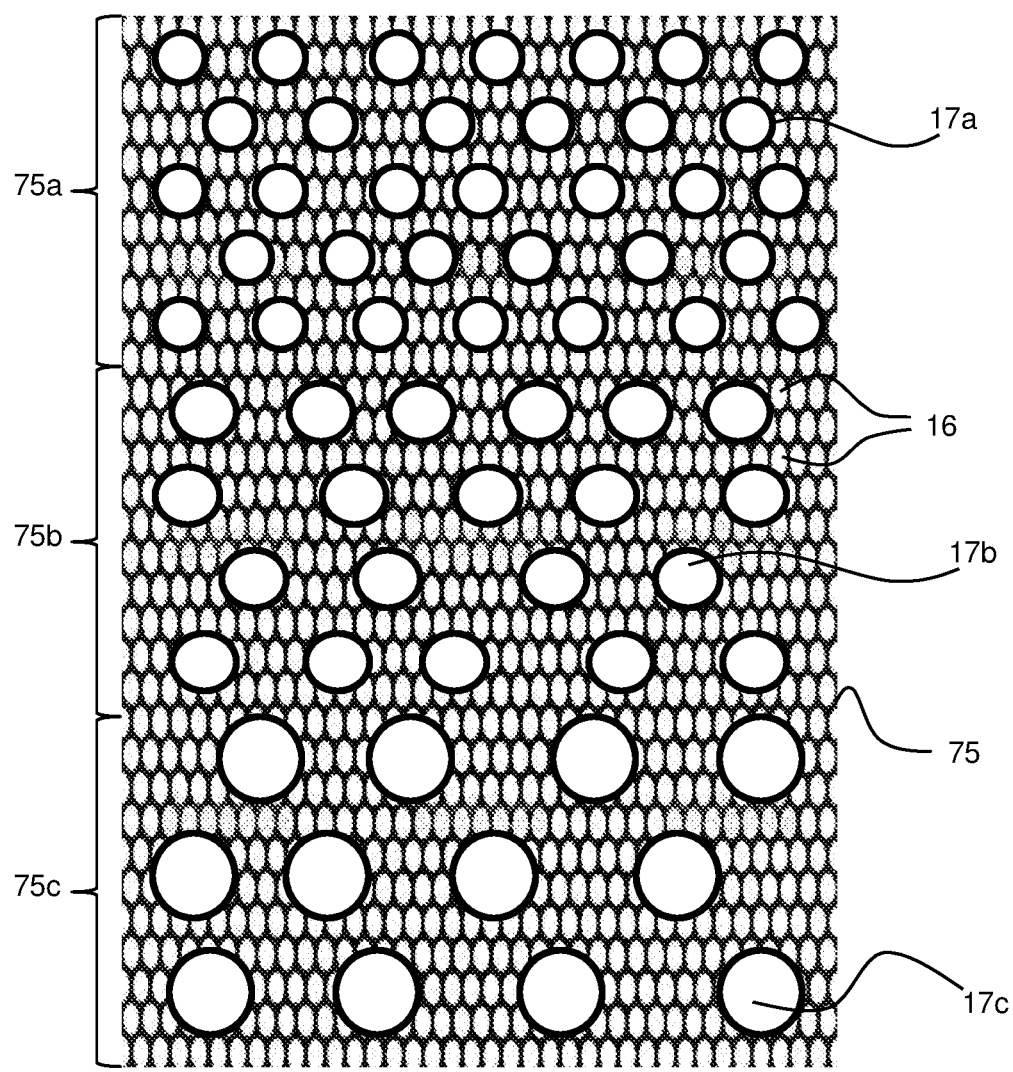
FIG. 4 is a plan view of another embodiment of a screen for use in the apparatus of FIG. 1 or 2.

Referring to FIGS. 3 to 6, various embodiments of the screen 5 are illustrated for use in the apparatus 1. In FIGS. 3 and 4, the screen comprises a mesh 70 having a plurality of apertures 16 and larger sized openings or sink holes 17. The sink holes 17 are located in pairs or three in a "row" at regular intervals and between the apertures 16 (to form a generally regular pattern) in FIG. 3. In one variation, the mesh 70 may have the sink holes 17 located at irregular intervals, so long there is sufficient coverage of the mesh to prevent a high density coarse particle 6 be able to move along the surface without encountering at least one the sink holes 17.

In FIG. 4, another embodiment of the screen comprises a mesh 75 with larger sized openings or sink holes 17a, 17b, 17c of varying size. This embodiment of the screen is designed to facilitate different sized, higher density coarse particles 6 passing through the sink holes 17a, 17b, 17c. It is known that the coarse particles tend to consist of particles of different sizes, for example ranging from 1 to 10 mm in diameter. Hence, the smaller sized coarse particles (about 1 to 3 mm) are normally much larger in number than the larger sized coarse particles (about 7 to 10 mm). Therefore, in FIG. 4, the mesh 75 is divided into discrete regions 75a, 75b, 75c with a corresponding group or set of sink holes 17a, 17b, 17c directed to enabling higher density coarse particles 6 of gradually increasing size to pass through.

The number of smaller sized sink holes 17a in region 75a is greater than the number of the intermediate sized sink holes 17b in region 75b, which in turn are greater in number than the largest sized sink holes 17c in region 75c. Thus, the embodiment is able to optimally cater for the greater number of the smaller higher density coarse particles with a greater number of sink holes 17a, while providing a smaller number of openings 17b to optimally cater for the smaller number of intermediate sized higher density coarse particles, and a minimal number of the largest sink holes or openings 17c to optimally cater for the even smaller number of the largest higher density coarse particles. In one particular preferred embodiment, the smaller sized sink holes 17c have a diameter of 6 mm to cater for higher density coarse particles having a diameter of 1 to 3 mm, intermediate sized sink holes 17b have a diameter of 12 mm to cater for higher density coarse particles having a diameter of 3 to 6 mm and the largest sized sink holes 17c have a diameter of 15 to 20 mm to cater for higher density coarse particles having a diameter of 6 to 10 mm. Clearly, some of the smaller higher density coarse particles (for example, 1 to 3 mm) may traverse the largest openings 17c (for example, 15 to 20 mm) and experience less efficient separation, but it will be appreciated that these smaller higher density coarse particles are more likely to interact with the smaller openings 17a than the larger openings 17c.

In this embodiment, it is also noted that the largest openings or sink holes 17c are located near one end of the screen 75 that is intended to be the final exit point of the screen adjacent the outlet 50 of the apparatus 1, where conditions are created to compensate for a greater tendency for the smallest of the higher density coarse particles to pass through the largest openings or sink holes 17c. In addition, that adjustment in the local air velocity near the exit point causes a shift in the separation density of the smaller higher density coarse particles passing across the largest sink holes 17c. A slight tilt or inclination in the screen results in more of the fine particulate medium passing up through the largest openings or sink holes 17c, again causing a shift in the separation density of the smaller higher density coarse particles passing across the largest sink holes 17c.

Figures 5, 6:
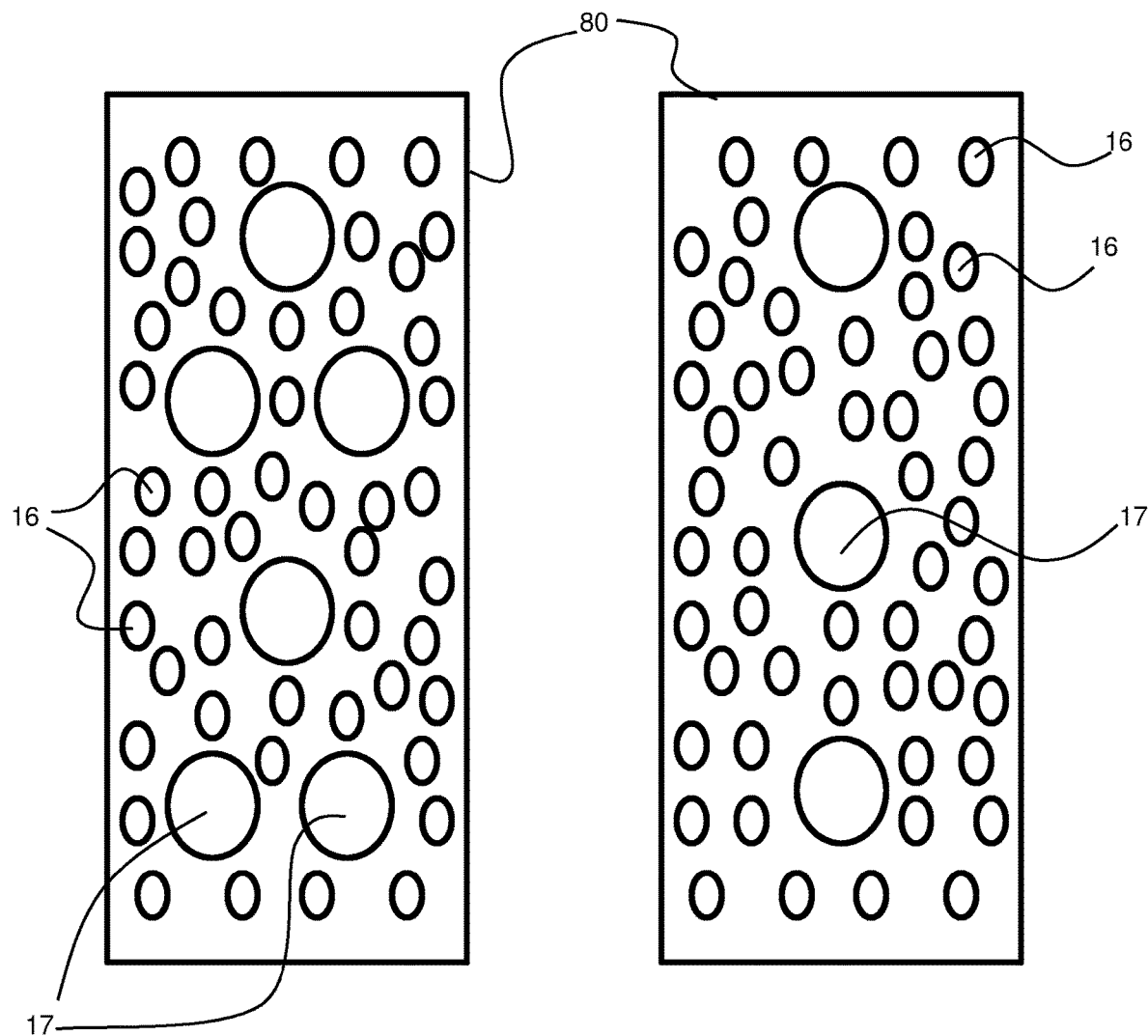
FIG. 5 is a plan view of a further embodiment of a screen for use in the apparatus of FIG. 1 or 2.
FIG. 6 is a plan view of yet another embodiment of a screen for use in the apparatus of FIG. 1 or 2.

In FIGS. 5 and 6, the screen comprises a plate 80 with a plurality of apertures 16 and larger sized openings or sink holes 17. The sink holes 17 are also located at regular intervals in FIGS. 4 and 5. However, in FIG. 5, the sink holes 17 are aligned to a longitudinal axis of the plate 80.

It will be appreciated that the apertures 16 and sink holes 17 may have different shapes, such as rectangles (thus forming slots), oval, squares, triangles or any other polygonal shape. However, it is preferred that square or rectangular shapes are used for the apertures 16. In addition, the apertures 16 and/or sink holes 17 can vary in size in the same screen so long as they meet their functional requirements. That is, the apertures 16 should be sufficiently small to permit the fine particulate medium to pass back through the screen 5 and into the fluidised bed 2, while the sink holes 17 must be sufficiently large to enable the higher density coarse particles 6 to fall back through the screen 5 and into the fluidised bed 2.

In a separator device that transports the coarse particles across the screen, such as the apparatus 1 of FIG. 2, it is preferred that the openings or sink holes 17 of a given size cover the full width of the screen 5 more than once. This means that all the coarse particles are exposed to all the differently sized openings or sink holes 17a, 17b, 17c as they traverse the full length of the screen 5 from the inlet 47 to the outlet 50. Hence, in other embodiments, the sink holes 17a, 17b, 17c are not confined to separate regions 75a, 75b, 75c but are spread across the entire screen 75.

In other embodiments, the screen 5 is not necessarily above the chamber 3 but is located to one side. Similarly, the fluidising device 4 is not necessarily located below the chamber 3 but is located to another side, preferably an opposite side to the side from which the screen 5 is located.

It should also be noted that while the hood 40 advantageously prevents the escape of fine dust and assists in recovering the fine particulate medium for reuse, it is not necessary to provide the hood 40 in all embodiments of the invention. For example, the apparatus 1 may be located within a room to ensure that any fine dust is contained and does not escape, and may be recovered. Also, other types of covers may be used instead of the hood 40, such as a sheath, housing, jacket, canopy or dome. In addition, the cover needs to be connected to the chamber 3, but can be located adjacent, over or in general proximity of the screen 5 to capture the fine dust.

While the above described embodiments employ multiple sink holes 17 in the screen 5, it will be appreciated that the apparatus 1 may use a single sink hole. This may occur in a smaller apparatus and/or a square-shaped screen 5.

EXAMPLE

A prototype of the apparatus 1 in accordance with FIG. 1 was used to separate coarse particles of different density having a nominal size within the range of 1 to 10 mm in diameter. The screen 5 had small apertures 16 with a diameter of 1 mm and a single large opening or sink hole 17 with a diameter of 9 mm. The fine particulate medium comprised sand, of which 2.9 kg was poured into the chamber 3. Different air flow rates for the fluidising device 4 were used to assess the apparatus 1 and the results are shown in the graphs of FIGS. 7 and 8.

Figure 7:
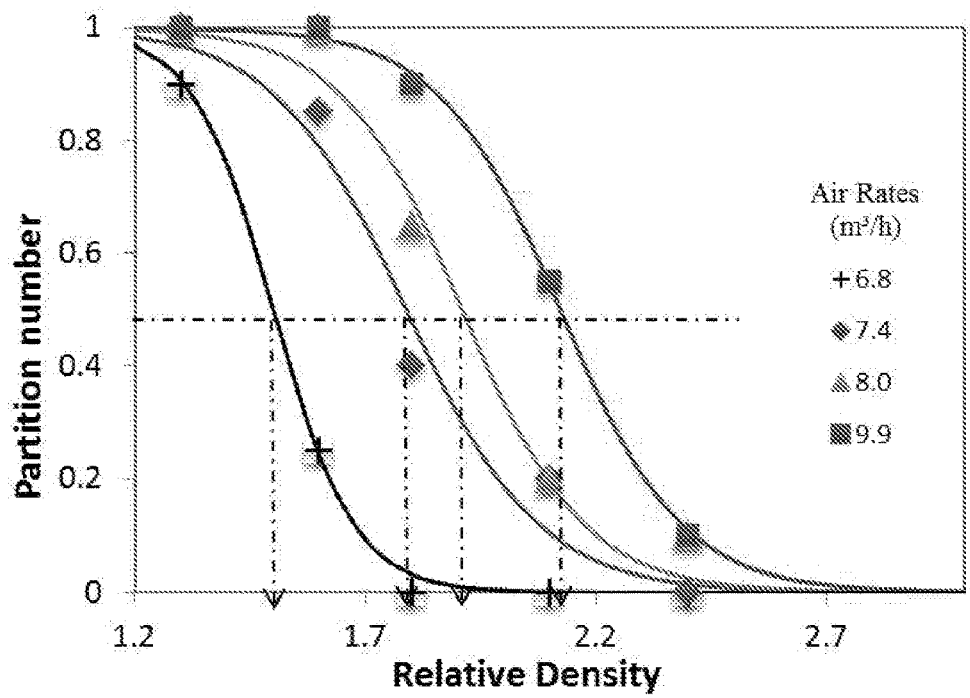
FIG. 7 is a graph illustrating the partition number against the relative particle density for an example in accordance with an embodiment of the invention.

In FIG. 7, the graph shows a comparison of the partition number and the relative density of the separated higher density coarse particles for air flow rates of 6.8, 7.4, 8.0 and 9.9 m³/h. The partition number denotes the fraction of the coarse particles of a given density that remained on the screen 5. It can be seen from this graph that the separation density, which denotes the relative density corresponding to a partition number of 0.5, increases as the air flow rate increases. This means that more of the coarse particles remained on the screen as the air rate increased.

Figure 8:
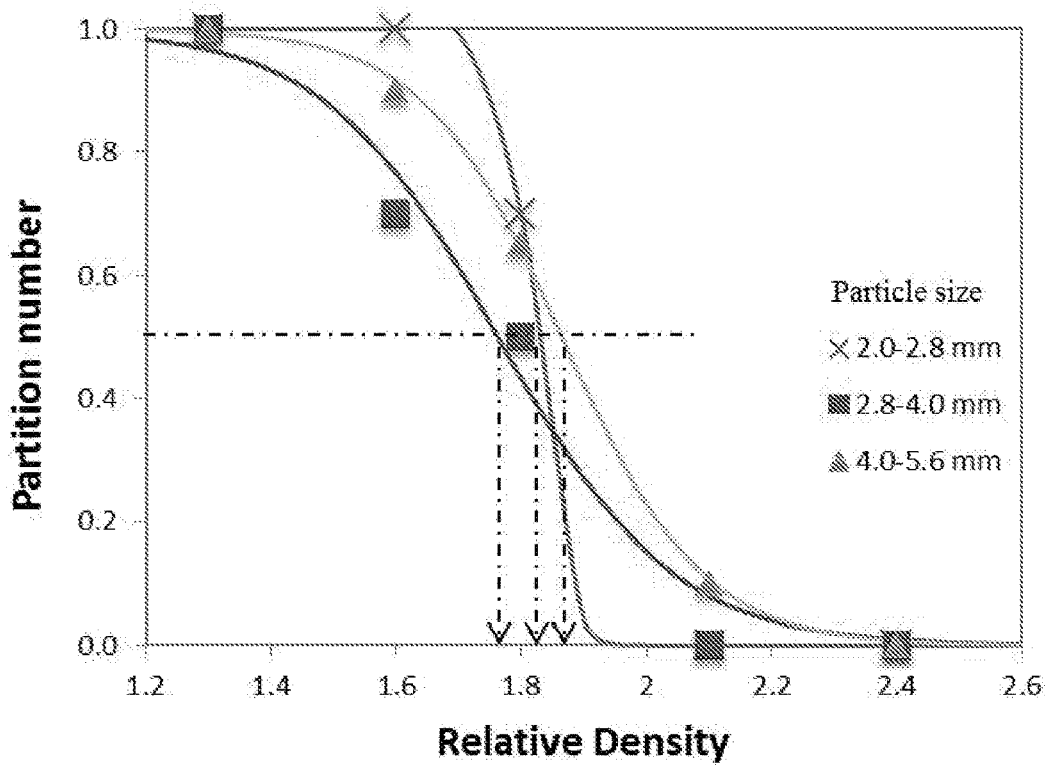
FIG. 8 is a graph illustrating the partition number against the relative particle density for the example of FIG. 7.

In FIG. 8, the graph shows the partition curves for three different ranges of higher density coarse particle sizes—2.0 to 2.8 mm, 2.8 to 4.0 mm and 4.0 to 5.6 mm, where the air flow rate is 7.4 m³/h. The $D_{50}$, or separation density, of all three size ranges or fractions only differs by 0.1 g/cm³ while the Ep is very efficient, ranging from 0.03 to 0.15 g/cm³. The Ep defines the error in the separation density and is based on the density values at partition numbers of 0.75 and 0.25. The difference between these two densities (in units of g/cm³), divided by two, is equivalent to the usual magnitude of the Ep as used in water based gravity separation. As understood by one skilled in the art, a $D_{50}$ is the particle density corresponding to a particle that has a 50% chance of passing through a sink hole. Hence, the $D_{50}$ provides a measure of the separation density.

Figure 9:
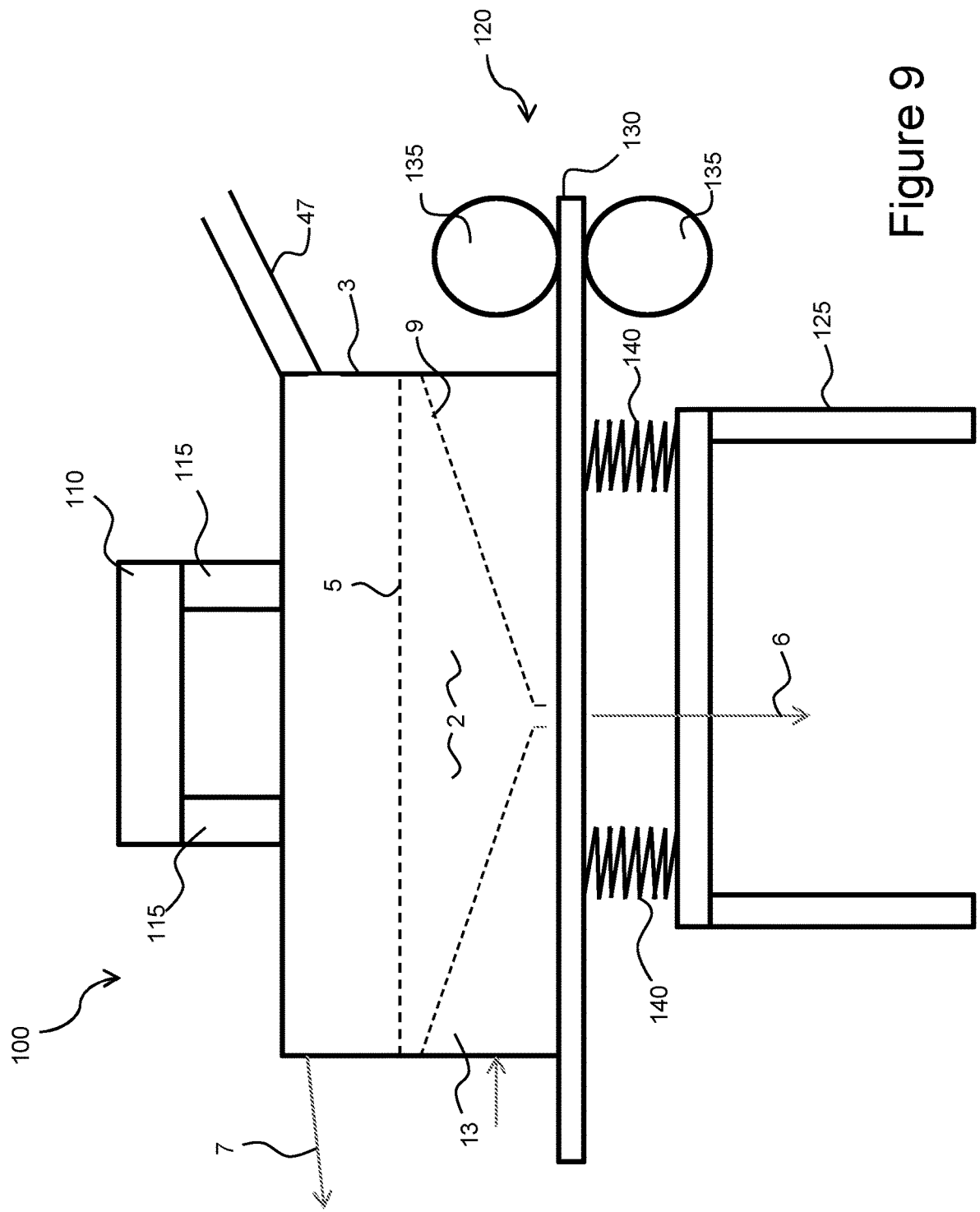
FIG. 9 is a side view of an apparatus for the dry separation of coarse particles according to a further embodiment of the invention.

Referring to FIG. 9, a further embodiment of the invention is illustrated, showing an apparatus 100 having separate vibratory mechanisms to influence the fluidisation of the fine particulate medium and transportation of the coarse particles across the screen 5. For clarity purposes, the apparatus 100 is shown without a cover, shroud or hood, and without any details relating the screen 5, such as the apertures or sink holes 17. The feed comprising a mixture of coarse particles and fine particulate medium is fed into the chamber 3 via conduit 47. A vibratory mechanism in the form of a pneumatic vibrator 110 is mounted to the chamber 3 via mounting members 115. The pneumatic vibrator 110 applies vibrations to the screen 5 through the chamber 3 to influence the fluidisation of the fine particulate medium and/or facilitate formation of a homogeneous fluidised bed 2. Another vibratory mechanism 120 is mounted below the chamber 3 on a support 125 and comprises one or more supporting members in the form of beams 130 connected to a pair of vibratory motors 135 on either side of the beams 130. The beams 130 are mounted on springs 140 connected to the support 125, so that the entire chamber 3 is able to move under vibrations created by the vibratory mechanism 120. The vibratory motors 135 induce an oscillatory vibratory motion to the chamber 3 via the beams 130 that causes transportation of the coarse particles across the screen 5 and separation of higher density particles 6 from lower density particles 7, as described above.

It will further be appreciated that any of the features in the preferred embodiments of the invention can be combined together and are not necessarily applied in isolation from each other. For example, the feature of a feed inlet 47 in FIG. 6 can be added to the apparatus of FIG. 1. Similar combinations of two or more features from the above described embodiments or preferred forms of the invention can be readily made by one skilled in the art.

The embodiments of the invention thus seek to simulate attributes that exist in liquid fluidisation. In liquid fluidisation, the medium is usually water, which has a tendency to flow, and in turn carry the lower density particles to the overflow launder. The surface of the liquid is simulated in the embodiments of the invention by providing a screen 5 just above the dry fluidised bed 2, with relatively small apertures 16 and one or more sink holes 17. The upper screen surface 15 creates or simulates the interface that exists between a liquid medium and the gas phase above, providing improved integrity and stability.

Moreover, with a conventional dense medium, gas-solid, fluidised bed, it is difficult to force the coarse particles to transport to an overflow launder because they tend to sit just below the fluidised bed surface. Therefore, to lift the coarse particles up and over the weir, and then into the external launder results in a loss of fluidisation because the gas cannot overflow out of the apparatus. Thus, the fine medium particles separate from the gas flow. In contrast, in the embodiments of the invention, the presence of the larger sized openings in the forms of sink holes 17, slots and the like permits the fine particulate medium to rise upwards. This ensures that the low density coarse particles do not sink at all. The screen surface 15 keeps the low density coarse particles at the correct level, outside of the fluidised bed 2. Moreover, the apparatus capacity is not limited by the hold-up of low density coarse particles within the medium. Consequently, high throughput screen capacity is thus achieved in the embodiments of the invention. In all these respects, the invention represents a practical and commercially significant improvement over the prior art.

Although the invention has been described with reference to specific examples, it will be appreciated by those skilled in the art that the invention may be embodied in many other forms.

The invention claimed is:

1. An apparatus for the dry separation of a mixture of coarse particles having low density coarse particles and high density coarse particles, comprising:
   a chamber for receiving a fine particulate medium;
   a screen adjacent said chamber for separating said mixture of coarse particles, said screen comprising a screen surface for receiving said mixture of coarse particles thereon, a plurality of apertures and one or more openings larger in size than said apertures; and
   a fluidising device fluidly connected to said chamber for directing a fluidising fluid into said chamber to fluidise said fine particulate medium, thereby creating a fluidised bed directed towards said screen to carry said mixture of coarse particles towards said screen;
   wherein said one or more openings are configured to permit said fine particulate medium and said mixture of coarse particles, carried by the fluidised bed to pass through said screen from said chamber;

said apertures are configured to permit said fine particulate medium to pass back through said screen to said chamber and to prevent said mixture of coarse particles, from passing back through said screen;

said one or more openings also being configured to permit the high density coarse particles to pass back through said screen to said chamber; and said screen retains the low density coarse particles on said screen surface.

2. The apparatus of claim 1, wherein said screen comprises a mesh and there is a plurality of said openings spaced apart at regular intervals in said mesh and between said apertures.

3. The apparatus of claim 1, wherein said screen comprises a plate and there is a plurality of said openings spaced apart at regular intervals in said plate and between said apertures.

4. The apparatus of claim 1, wherein there is a plurality of said openings, said openings being substantially the same size and having a diameter at least twice the maximum diameter of the high density coarse particles.

5. The apparatus of claim 1, wherein the screen and the fluidising device are located at opposite sides of said chamber.

6. The apparatus of claim 1, wherein said screen is located above said chamber and said fluidising device is located below said chamber.

7. The apparatus of claim 1, further comprising a cover for preventing escape of said fine particulate medium, said cover having an exhaust for controllably removing said fine particulate medium, wherein said exhaust is fluidly connected to a recycling conduit for returning said fine particulate medium to said chamber.

8. The apparatus of claim 1, wherein said chamber comprises a first vibration mechanism for facilitating movement of said mixture of coarse particles, across said screen, said first vibration mechanism being connected to the chamber and/or the screen.

9. The apparatus of claim 8, wherein said chamber comprises a second vibration mechanism for influencing the fluidisation of the fine particulate medium and/or facilitating formation of a homogeneous fluidised bed, said second vibration mechanism being connected to the chamber and/or the screen.

10. The apparatus of claim 1, wherein said screen comprises two or more openings that are different in size to permit the high density coarse particles of different sizes to pass back through said screen to the chamber.

11. The apparatus of claim 10, wherein there are a greater number of openings that are smaller in size than the number of openings that are larger in size.

12. The apparatus of claim 10, wherein a first group of openings has a diameter of 6 mm, a second group of openings has a diameter of 12 mm and a third group of openings has a diameter of between 15 and 20 mm.

13. The apparatus of claim 12, wherein said screen comprises a fourth group of openings located near an outlet, said fourth group of openings being configured to remove said low density coarse particles from said screen.

14. A method for the dry separation of a mixture of coarse particles having low density coarse particles and high density coarse particles, comprising:

feeding a fine particulate medium into a chamber;

providing a screen with a screen surface for receiving said mixture of coarse particles thereon, a plurality of apertures and one or more openings larger in size than said apertures;

directing a fluidising fluid through said chamber to fluidise said fine particulate medium, thereby creating a fluidised bed directed towards said screen;

carrying said mixture of coarse particles towards said screen by way of said fluidised bed;

configuring said one or more openings so that:
said fine particulate medium and said mixture of coarse particles, carried by said fluidised bed pass through said one or more openings from said chamber; and
the high density coarse particles pass back into said chamber through said one or more openings;

configuring the apertures so that:
said fine particulate medium passes through said apertures back into said chamber; and
said mixture of coarse particles, are prevented from passing back through said apertures; and retaining the low density coarse particles on said screen surface.

15. The method of claim 14, wherein there is a plurality of said openings, the method further comprising spacing apart said openings at regular intervals in the screen and between the apertures.

16. The method of claim 14, comprising varying a flow rate of the fluidising flow across the screen.

17. The method of claim 14, comprising removing said fine particulate medium displaced from said screen and recycling said fine particulate medium to said chamber.

18. The method of claim 14, comprising vibrating said chamber and/or screen to facilitate movement of said mixture of coarse particles, across said screen, influence the fluidisation of the fine particulate medium, facilitate formation of a homogeneous fluidised bed or any combination thereof.

19. The method of claim 14, comprising providing two or more openings that are different in size to permit the high density coarse particles of different sizes to pass back through said screen to the chamber.

20. The method of claim 19, comprising providing a greater number of openings that are smaller in size than the number of openings that are larger in size.

* * * * *